(12) United States Patent
Leinonen et al.

(10) Patent No.: US 11,827,733 B2
(45) Date of Patent: Nov. 28, 2023

(54) CATALYST AND PREPARATION THEREOF

(71) Applicant: BOREALIS AG, Vienna (AT)

(72) Inventors: Timo Leinonen, Porvoo (FI); Peter Denifl, Linz (AT); Alexander Reznichenko, Porvoo (FI); Frank Schröder, Linz (AT)

(73) Assignee: BOREALIS AG, Vienna (AT)

( * ) Notice: Subject to any disclaimer, the term of this patent is extended or adjusted under 35 U.S.C. 154(b) by 119 days.

(21) Appl. No.: 17/299,953

(22) PCT Filed: Dec. 19, 2019

(86) PCT No.: PCT/EP2019/086501
§ 371 (c)(1),
(2) Date: Jun. 4, 2021

(87) PCT Pub. No.: WO2020/127859
PCT Pub. Date: Jun. 25, 2020

(65) Prior Publication Data
US 2021/0340288 A1 Nov. 4, 2021

(30) Foreign Application Priority Data
Dec. 21, 2018 (EP) .................................... 18215185

(51) Int. Cl.
*C08F 4/642* (2006.01)
*C08F 110/06* (2006.01)
*C08F 4/02* (2006.01)

(52) U.S. Cl.
CPC .......... *C08F 4/6421* (2013.01); *C08F 110/06* (2013.01); *C08F 2410/06* (2021.01)

(58) Field of Classification Search
CPC ...... C08F 4/022; C08F 4/6421; C08F 110/06; C08F 2410/06
See application file for complete search history.

(56) References Cited

U.S. PATENT DOCUMENTS 6,875,721 B1   4/2005   Garoff et al.
2007/0142220 A1   6/2007   Ok

FOREIGN PATENT DOCUMENTS

CN   1317022 A   10/2001
CN   1953994 A   4/2007
(Continued)

OTHER PUBLICATIONS

Applicant: Borealis AG; "Catalyst and Preparation Thereof"; Chinese Application No. 201980074507.2; Chinese First Office Action dated Sep. 28, 2022; 11 pgs.
(Continued)

*Primary Examiner* — Catherine S Branch
(74) *Attorney, Agent, or Firm* — TAROLLI, SUNDHEIM, COVELL & TUMMINO L.L.P.

(57) ABSTRACT

The present invention relates to a process for producing solid Ziegler-Natta catalyst component in the form of solid particles having a median particle size ($D50_{vol}$) of 5 to 500 μm the process comprising steps I. providing a solution of a mixture of Group 2 metal compounds of i) a solution of a Group 2 metal dihalide and ii) at least one Group 2 metal alkoxide of the Periodic Table (IUPAC, Nomenclature of Inorganic Chemistry, 2005) II. contacting the solution of the mixture of Group 2 metal compounds of step I with a compound in a liquid form of a transition metal of Group 4 to 10, or of a lanthanide or actinide, preferably a transition metal of Group 4 to 6 of Periodic Table (IUPAC, Nomenclature of Inorganic Chemistry, 2005), and III. recovering the solid catalyst component, wherein the solution of a Group 2 metal dihalide i) is obtained by dissolving a solid Group 2 metal dihalide in an alcohol comprising at least a monohydric alcohol of formula ROH, where R is selected from hydrocarbyl of 3 to 16 C atoms, and wherein the amount of Group 2 metal originating from Group 2 metal dihalide in the solution of the mixture of Group 2 metal (Continued)

Figure 1:
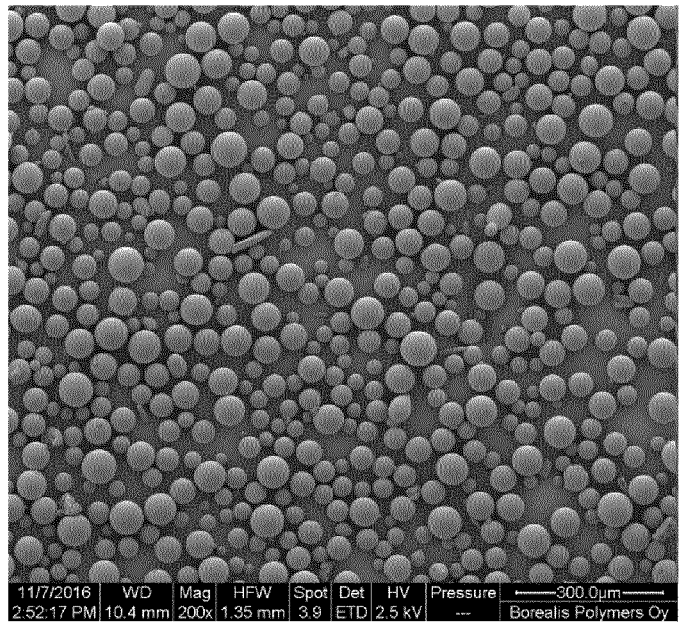

compounds is in the range of 5 to 90 mol-%. The invention further relates to a catalyst comprising the catalyst component and use thereof in olefin polymerisation process.

9 Claims, 3 Drawing Sheets

(56) References Cited

FOREIGN PATENT DOCUMENTS

| | | |
|---|---|---|
| EP | 0428054 A1 | 5/1991 |
| EP | 0688794 A1 | 12/1995 |
| EP | 0376936 B1 | 4/1996 |
| EP | 0591224 B1 | 2/1998 |
| EP | 1042331 A1 | 10/2000 |
| EP | 1109842 A1 | 6/2001 |
| EP | 0926165 B1 | 2/2002 |
| EP | 0810235 B1 | 11/2004 |
| EP | 2610270 A1 | 7/2013 |
| WO | 92/12182 A1 | 7/1992 |
| WO | 199858975 A1 | 12/1998 |
| WO | 1999/051646 A1 | 10/1999 |
| WO | 2001/055230 A1 | 8/2001 |
| WO | 2003/000754 A1 | 1/2003 |
| WO | 2003/000757 A1 | 1/2003 |
| WO | 2004/029112 A1 | 4/2004 |
| WO | 2005/118655 A1 | 12/2005 |
| WO | 2006063771 A1 | 6/2006 |
| WO | 2007/137853 A1 | 12/2007 |
| WO | 2007137849 A1 | 12/2007 |
| WO | 2012/007430 A1 | 1/2012 |
| WO | 2013098137 A1 | 7/2013 |
| WO | 2013098138 A1 | 7/2013 |
| WO | 2013098149 A1 | 7/2013 |
| WO | WO-2017009405 A1 * | 1/2017 ............ C08F 110/06 |
| WO | 2018185024 A1 | 10/2018 |
| WO | 199618662 A1 | 6/2021 |

OTHER PUBLICATIONS

Applicant: Borealis AG; "Catalyst and Preparation Thereof"; Chinese Application No. 201980074507.2; Chinese Second Office Action dated Feb. 12, 2023; 11 pgs.

* cited by examiner

CATALYST AND PREPARATION THEREOF

This invention relates to a solid Ziegler-Natta catalyst component for producing olefin polymers and preparation thereof. Further, the invention relates to a Ziegler Natta catalyst comprising said solid catalyst component, Group 13 metal compound as cocatalyst and optionally an external electron donor. The invention further relates to the use of said catalyst component in producing $C_2$ to $C_{10}$ olefin polymers and (co)polymers thereof with other olefins of 2 to 12 C-atoms, especially ethylene and propylene polymers and copolymers thereof.

BACKGROUND OF THE INVENTION

Ziegler-Natta (ZN) type polyolefin catalysts are well known in the field of producing olefin polymers, like $C_2$ to $C_{10}$ olefin polymers and (co)polymers thereof with other α-olefins of 2 to 12 C-atoms. Generally, the catalysts comprise at least a catalyst component formed from a transition metal compound of Group 4 to 10, or of lanthanide or actinide of the Periodic Table (IUPAC, Nomenclature of Inorganic Chemistry, 2005), a compound of a metal of Group 1 to 3 of the Periodic Table (IUPAC), and optionally, a compound of Group 13 of the Periodic Table (IUPAC), and optionally, an internal organic compound, like an internal electron donor. A ZN catalyst may also comprise further catalyst component(s), such as a cocatalyst and optionally an external electron donor.

A great variety of Ziegler-Natta catalysts have been developed to fulfill the different demands in reaction characteristics and for producing poly(alpha-olefin) resins of desired physical and mechanical performance. Typical Ziegler-Natta catalysts contain a magnesium compound, a titanium compound and optionally an aluminium compound supported on a particulate support. The commonly used particulate supports are Mg dihalide, preferably $MgCl_2$ based supports, or inorganic oxide type supports, such as silica, alumina, titania, silica-alumina or silica-titania, typically silica.

Typical supported Ziegler-Natta catalysts based on $MgCl_2$ contain a titanium compound and optionally a Group 13 compound, for example, an aluminium compound. Such catalysts are disclosed, for instance, in EP376936, EP591224, WO 2005/118655 and EP 810235 disclosing also spray-drying or spray-crystallisation methods for producing $MgCl_2$-based support materials.

EP1042331 and EP0926165 disclose catalyst preparation methods, where $MgCl_2$ is used as a compound forming complexes with in situ prepared donors, being phthalic donors. Catalysts are prepared by precipitation.

The catalyst component can be prepared by sequentially contacting the inorganic support with the above mentioned compounds, for example, as described in EP 688794 and WO 99/51646. Alternatively, it may be prepared by first preparing a solution from the components and then contacting the solution with a support, as described in WO 01/55230.

Still another way to produce solid ZN catalyst component is based on a method, where catalyst component ingredients are reacted in solution and the solid catalyst component is obtained by a solidification or precipitation method. Such preparation method is described e.g. in patent publications WO2003/000757, WO2003/000754, WO2004/029112, WO2007/137849 and WO2007/137853, and further in patent publications WO2012/007430, WO2013/098149, WO2013/098137 and WO2013098138, which disclose catalysts prepared without any phthalic compounds, typically used as internal electron donors.

The above described ZN-catalysts are claimed to be useful in olefin polymerisation, for example for producing polymers of α-olefins of 2 to 10 C-atoms, especially of ethylene, propylene, 1-butene or (co)polymers thereof with ethylene and/or other α-olefins of 3 to 12 C-atoms.

Even though many suitable methods are developed to produce catalysts with desired properties and performance, there is a need to find improved methods to prepare the desired catalysts in more efficient and more environmentally friendly way, an still obtain the catalyst with desired properties and performance.

In olefin catalyst manufacturing processes, undesired chemicals, e.g. volatile chemicals, like volatile hydrocarbons, are typically used in the process. In addition, in some reaction steps volatile hydrocarbons are formed as side products of the process, which is from environmental point of view a potential risk. Further, it is desired to find a solution to decrease the amount of used chemicals, which are pyrophoric in nature, and which may be of high viscosity solutions making the use thereof demanding in synthesis. An additional problem in Ziegler-Natta catalyst preparation process relates to recovery and handling of waste streams comprising non-desired compounds.

Solving the above problems should not be made on the cost of catalyst production, i.e. catalyst yield, and outtake from the catalyst production should still be on a good level, preferably to be improved. Thus, finding alternative raw materials for catalyst production, which would decrease the problems as indicated above and would still keep, preferably increase catalyst production capacity, is highly desired. Decrease the costs in catalyst raw material and preparation is naturally a benefit in improved and modified methods.

SUMMARY OF THE INVENTION

Thus, the object of the present invention is to provide a process for producing solid Ziegler-Natta catalyst component in the form of solid particles having a median particle size ($D50_{vol}$) of 5 to 500 μm and the process comprising steps 1. providing a solution of a mixture of Group 2 metal compounds of
   i) a solution of a Group 2 metal dihalide and
   ii) at least one Group 2 metal alkoxide of the Periodic Table (IUPAC, Nomenclature of Inorganic Chemistry, 2005)
II. contacting the solution of the mixture of Group 2 metal compounds of step I with a compound in a liquid form of a transition metal of Group 4 to 10, or of a lanthanide or actinide, preferably a transition metal of Group 4 to 6 of Periodic Table (IUPAC, Nomenclature of Inorganic Chemistry, 2005), and
III. recovering the solid catalyst component,
   wherein the solution of a Group 2 metal dihalide i) is obtained by dissolving a solid Group 2 metal dihalide in an alcohol comprising at least a monohydric alcohol of formula ROH, where R is selected from hydrocarbyl of 3 to 16 C atoms, and
   wherein the amount of Group 2 metal originating from Group 2 metal dihalide in the solution of the mixture of Group 2 metal compounds is in the range of 5 to 90 mol-%.

Viewed from still another aspect the invention provides a Ziegler-Natta catalyst component in the form of solid particles having a median particle size ($D50_{vol}$) of 5 to 500 μm obtainable, preferably obtained, by the process as herein described.

Viewed from still another aspect, the present invention provides a process for producing $C_2$ to $C_{40}$ α-olefin polymers and copolymers thereof with $C_2$ to $C_{12}$ α-olefin comonomers in the presence of a Ziegler-Natta catalyst component as herein described.

Further, the object of the present invention is the use of the Ziegler-Natta catalyst component as herein described for producing of $C_2$ to $C_{10}$ α-olefin polymers and copolymers thereof with $C_2$ to $C_{12}$ α-olefin comonomers.

In addition, the invention relates to a catalyst comprising the Ziegler-Natta catalyst component as herein described, a cocatalyst and optionally an external electron donor, and use of said catalyst in olefin polymerisation process.

The external electron donor denotes a component being not part of the solid catalyst component, but fed as a separate component to the polymerisation process.

DETAILED DESCRIPTION OF THE INVENTION

As indicated above, Group 2 metal dihalide is used as one raw material in the process for producing the solid catalyst component as herein defined. It is provided as a solution in an alcohol comprising at least a monohydric alcohol of at least 3 carbon atoms, preferably at least 4 carbon atoms.

The Group 2 metal is preferably magnesium. The halide is preferably chlorine. Thus, Group 2 metal dihalide used in the present invention is preferably $MgCl_2$.

Group 2 metal alkoxide is preferably a Mg alkoxide.

Using a Group 2 metal dihalide, preferably $MgCl_2$, as a Group 2 metal source, preferably Mg source, in the preparation of the solid catalyst component of the invention provides several benefits. $MgCl_2$, as a basic chemical, is easily available from commercial sources. $MgCl_2$ it is not a hazardous material and is easy to handle also in a larger scale production. However, it has to be taken into account that it is hygroscopic material, i.e. to be handled and stored under conditions, where any contacts with water are avoided.

In the solution of a mixture of Group 2 metal compounds the fraction of Group 2 metal originating from Group 2 metal dihalide is in the range of 5 to 90 mol-%, preferably in the range of 10 to 85 mol-%, more preferably in the range of 10 to 70 mol-%, and still more preferably in the range of 20 to 60 mol-%.

The same fractions and preferred fractions apply, when the preferred Group 2 metal compounds, preferably $MgCl_2$ and one or more Mg alkoxides, are included in the solution of the mixture of Group 2 metal compounds of step I of the preparation process.

By definition, the at least one Group 2 metal alkoxide comprises one or more Group 2 metal alkoxides.

Group 2 metal alkoxides are defined in more detail later in the application.

The transition metal compound of Group 4 to 10, or of a lanthanide or actinide is preferably a compound of Group 4 to 6, more preferably a Group 4 transition metal compound or a vanadium compound and is still more preferably a titanium compound. More preferably the titanium compound is a halogen-containing titanium compound of the formula $X_yTi(OR^8)_{4-y}$, wherein each $R^8$ is independently a $C_{1-20}$ alkyl, preferably a $C_{2-10}$ and more preferably a $C_{2-8}$ alkyl group, X is halogen, preferably chlorine and y is 1, 2, 3 or 4, preferably 2, 3 or 4 and more preferably 4.

Suitable titanium compounds include trialkoxy titanium monochloride, dialkoxy titanium dichloride, alkoxy titanium trichloride and titanium tetrachloride. Most preferably, titanium tetrachloride is used in the process of the present invention.

According to one embodiment, the catalyst component prepared by the process of the present invention, may also comprise an internal electron donor. The optional internal donor may be added at any step before the recovery of the solid catalyst component, i.e. before step III. The optional internal electron donors are suitable among others, (di)esters of carboxylic (di)acids, like phthalates or esters of non-phthalic carboxylic (di)acids, (di)ethers or oxygen or nitrogen containing silicon compounds, or mixtures thereof. In the present application terms internal donor, internal electron donor and donor have the same meaning.

According to a preferred embodiment, an internal electron donor is added into the preparation process of the present invention.

The internal donor used in the process of the present invention is preferably selected from esters of non-phthalic carboxylic (di)acids, 1,3-diethers, derivatives and mixtures thereof. More preferably the internal electron donors are esters of non-phthalic (di)carboxylic acids, in particular esters belonging to a group comprising substituted or non-substituted malonates, maleates, succinates, substituted maleates, like citraconates, glutarates, cyclohexene-1,2-dicarboxylates and benzoates, and any derivatives and/or mixtures thereof. Especially preferred examples are e.g. substituted maleates, more preferably citraconates, especially di-2-ethylhexyl citraconate.

Catalyst components of the invention or prepared according to the method of the invention have a median particle size ($D50_{vol}$) of 5 to 500 μm preferably in the range of 5 to 300 μm, more preferably in the range of 5 to 200 μm, still more preferably in the range of 10 to 120 μm. In some embodiments the $D50_{vol}$ is preferably in the range of 20 to 100 μm.

Particle size distribution (PSD) is desired to be narrow in the catalyst component. PSD is typically defined as a relative distribution based on volumetric amount of particles, i.e. as volumetric SPAN ($SPAN_{vol}$).

$$SPAN_{vol}=(D90_{vol}-D10_{vol})/D50_{vol}$$

where
$D90_{vol}$=particle diameter at 90% cumulative volume,
$D10_{vol}$=particle diameter at 10% cumulative volume,
$D50_{vol}$=particle diameter at 50% cumulative volume (median particle size, vol)

According to a preferred embodiment the invention provides a process for producing solid Ziegler-Natta catalyst component in the form of solid particles having a median particle size ($D50_{vol}$) of 5 to 500 μm, preferably 5 to 200 μm and comprises steps:
I. providing a solution of a mixture of Group 2 metal compounds of
   i) a solution of a Group 2 metal dihalide and
   ii) at least one Group 2 metal alkoxide of the Periodic Table (IUPAC, Nomenclature of Inorganic Chemistry, 2005)
II. contacting the solution of a mixture of Group 2 metal compounds of step I with a compound in a liquid form of a transition metal of Group 4 to 6 of Periodic Table (IUPAC, Nomenclature of Inorganic Chemistry, 2005), and III. recovering the solid catalyst component,
wherein the solution of a Group 2 metal dihalide i) is obtained by dissolving a solid Group 2 metal dihalide in an alcohol comprising at least a monohydric alcohol of formula ROH, where R is selected from hydrocarbyl of 3 to 16 C atoms, preferably 4 to 14 C atoms, and
wherein the amount of Group 2 metal originating from Group 2 metal dihalide in the solution of a mixture of Group 2 metal compounds is in the range of 10 to 85 mol-%, preferably in the range of 10 to 70 mol-%, and more preferably in the range 20 to 60 mol-%.

Group 2 metal is preferably magnesium in the Group 2 metal compounds.

Preferably, an internal electron donor selected from esters of non-phthalic carboxylic (di)acids, 1,3-diethers, derivatives and mixtures thereof is added before the recovery step III. More preferably the internal electron donors are selected from esters of non-phthalic (di)carboxylic acids, in particular esters belonging to a group comprising substituted or non-substituted malonates, maleates, succinates, substituted maleates, like citraconates, glutarates, cyclohexene-1,2-dicarboxylates and benzoates, and any derivatives and/or mixtures thereof. Especially preferred examples are e.g. substituted maleates, more preferably citraconates, especially di-2-ethylhexyl citraconate.

As indicated above, the essential feature of the process of the present invention is that a part of the magnesium used in the preparation of the catalyst component originates from magnesium dichloride, which is dissolved in an alcohol comprising at least a monohydric alcohol (A1) of 3 to 16 carbon atoms, preferably 4 to 14 C atoms, more preferably 6 to 12 carbon atoms.

According to a preferred embodiment the Group 2 metal halide, preferably $MgCl_2$, is dissolved in a mixture of alcohols. Said alcohol mixture comprises in addition to the monohydric alcohol (A1) as defined above, an alcohol (A2) comprising in addition to the hydroxyl group another oxygen containing functional group not being a hydroxyl group. Alcohol (A2) comprises preferably an ether group, wherein the ether moiety comprises from 2 to 18 carbon atoms. Preferably, alcohol (A2) is a $C_2$ to $C_4$ glycol monoether.

Use of the mixture of the alcohols as defined above facilitates the solving of the metal halide into the alcohol. It has been found that solubility of the Group 2 metal dihalide, like $MgCl_2$, in alcohols (A2), preferably glycol ethers, is higher than in monohydric alcohols (A1). In addition, by using an alcohol (A2), e.g. glycol monoether, as a solvent for the Group 2 metal dihalide, the viscosity of the resulting solution is lower than using only a monohydric alcohol (A1) as a solvent. This gives an option to decrease the amount of other solvents, like hydrocarbon solvents, in catalyst preparation. The increased solubility of the Group 2 metal halide, preferably $MgCl_2$, in the glycol monoethers makes it possible to increase the amount of Mg t dissolved into the alcohols, and thus to control the amount of dissolved Mg in the solution. By selecting the ratio of alcohols (A1) and (A2) in the alcohol mixture gives a broader window to the amount of Group 2 metal halide, like $MgCl_2$, to be used as a Group 2 metal, like Mg source, in the catalyst preparation. Thus, using Group 2 metal halide, like $MgCl_2$ to replace at least part of the Mg originating from Mg alkoxides obtained from different sources will be an attractive option.

Mol ratio of alcohols (A1):(A2) in the alcohol mixture is in the range of 10:0 to 1:9, preferably in the range of 9:1 to 2:8, more preferably in the range of 8.5:1.5 to 3:7, and still more preferably in the range of 8.5:1.5 to 6:4, (or 100:0 to 10:90, preferably in the range of 90:10 to 10:90, preferably 90:10 to 20:80, more preferably in the range of 90:10 to 30:70, still more preferably in the range of 85:15 to 60:40).

As indicated above, Group 2 metal compounds used in the catalyst synthesis comprise in addition to Group 2 metal halide, preferably $MgCl_2$, at least one Group 2 metal alkoxide.

The Group 2 metal alkoxides, preferably magnesium alkoxy compounds, can be prepared by reacting a magnesium compound selected from magnesium dialkyls, alkyl magnesium alkoxides, magnesium dialkoxides, alkoxy magnesium halides, magnesium diaryloxides, magnesium aryloxyhalides, magnesium aryloxides, magnesium alkyl aryloxides and alkyl magnesium halides, with a monohydric alcohol of formula R'OH (A1'), or with a mixture of alcohols comprising in addition to said monohydric alcohol R'OH (A1'), an alcohol comprising in addition to the hydroxyl group another oxygen containing functional group not being a hydroxyl group (A2'), or mixtures thereof.

Alkyl groups in the magnesium compound may be similar or different $C_1$-$C_{20}$ alkyls, preferably $C_2$-$C_{10}$ alkyl. Typical alkyl-alkoxy magnesium compounds, when used, are ethyl magnesium butoxide, butyl magnesium pentoxide, octyl magnesium butoxide and octyl magnesium octoxide. Preferably, dialkyl magnesiums are used. Most preferred dialkyl magnesiums are butyl octyl magnesium or butyl ethyl magnesium.

In monohydric alcohols R'OH (A1') R' is linear or branched $C_2$-$C_{16}$ alkyl residue, preferably $C_4$ to $C_{10}$, more preferably $C_6$ to $C_8$ alkyl residue. The most preferred monohydric alcohol is 2-ethyl-1-hexanol or octanol.

Alcohols (A2') comprise preferably an ether group, wherein the ether moiety comprises from 2 to 18 carbon atoms. Preferably, such an alcohol is a $C_2$ to $C_4$ glycol monoether. Preferred examples are 2-(2-ethylhexyloxy) ethanol, 2-butyloxy ethanol, 2-hexyloxy ethanol and 1,3-propylene-glycol-monobutyl ether, 3-butoxy-2-propanol, with 2-(2-ethylhexyloxy)ethanol and 1,3-propylene-glycol-monobutyl ether, 3-butoxy-2-propanol being particularly preferred.

Alcohols (A1) and (A1') can be the same or different, and alcohols (A2) and (A2') can the same or different. Respective magnesium alkoxy compounds are (A1'x) and (A2'x). Mg alkoxides may be prepared in situ as a first step of the catalyst synthesis. According to one preferred embodiment a mixture of alcohols (A1') and (A2') is used in situ preparation.

According to a preferred embodiment, Mg alkoxide is prepared in situ by adding a Mg compound as defined above, preferably a magnesium dialkyl compound, into the solution of $MgCl_2$ in the alcohol (A1) or preferably into the solution of $MgCl_2$ in the mixture of alcohols (A1) and (A2), wherein the mol ratio of alcohols (A1):(A2) in the alcohol mixture is in the range of 10:0 to 1:9, preferably in the range of 9:1 to 2:8, more preferably in the range of 8.5:1.5 to 3:7, still more preferably in the range of 8.5:1.5 to 6:4. Alcohols (A1) and (A2) are as defined above.

Said magnesium alkoxy compounds may also be separately prepared magnesium alkoxy compounds ((A1'x) and (A2'x)) and optionally mixed, or they can be even commercially available as ready magnesium alkoxy compounds or mixtures thereof and used as such in the catalyst preparation process of the invention.

(A1'x) and (A2'x) or mixture of alcohols (A1') and (A2'), respectively, are used and employed in mol ratios of (A1'x): (A2'x) or (A1'):(A2'), resp. in the range of 10:0 to 1:9, preferably in the range of 9:1 to 2:8, or in the range of 10:1 to 1:10, more preferably in the range of 8.5:1.5 to 3:7, still more preferably in the range of 8.5:15 to 6:4, or in the range of 6:1 to 1:6.

The magnesium alkoxy compounds used in catalyst synthesis are thus selected from the group consisting of magnesium dialkoxides, diaryloxy magnesiums, alkyloxy magnesium halides, aryloxy magnesium halides, alkyl magnesium alkoxides, aryl magnesium alkoxides and alkyl magnesium aryloxides. Halides are preferably chlorine and alkyl groups as defined above. Aryl groups contain 6 to 12 C atoms, preferably 6 to 8 C atoms.

In a more preferred embodiment the solid catalyst component of the invention in the form of solid particles having volumetric median particle size ($D50_{vol}$) of 5 to 500 μm, more preferably 5 to 200 μm, is obtained, by the following procedure:

I. providing a solution of a mixture magnesium compounds of
   i) a solution of a magnesium dihalide and
   ii) at least one magnesium alkoxide
II. contacting the solution of the mixture magnesium compounds of step I with a compound in a liquid form of a transition metal of of Group 4 to 6 of Periodic Table (IUPAC, Nomenclature of Inorganic Chemistry, 2005), and
III. recovering the solid catalyst component, wherein the solution of a magnesium dihalide i) is obtained by dissolving a solid magnesium dihalide in an alcohol (A1) comprising at least a monohydric alcohol of formula ROH, where R is selected from hydrocarbyl 4 to 14 C atoms, preferably in a mixture of said monohydric alcohol (A1) and an alcohol (A2) comprising in addition to the hydroxyl group an ether group, in a mol ratio of alcohols (A1):(A2) in the range of 9:1 to 1:9, preferably in the range of 8.5:1.5 to 6:4, wherein the amount of magnesium originating from magnesium dihalide in the solution of the mixture magnesium compounds of step I is in the range of 10 to 85 mol-%, preferably 10 to 70 mol-%, and more preferably 20 to 60 mol-%, and an optional internal electron donor is added at any step before step III.

Preferably, an internal donor is added at any step before step III.

The optional internal electron donors used in the preparation of the catalyst component of the invention are suitably as defined above.

According to the preferred embodiment an internal electron donor selected from esters of non-phthalic carboxylic (di)acids, 1,3-diethers, derivatives and mixtures thereof is added before the recovery step III.

The compound of the transition metal Group 4 to 6 in liquid form is most preferably $TiCl_4$. $TiCl_4$ in liquid form can be used either as such or may be used as a mixture with a hydrocarbon solvent.

According to the procedure of the invention the solid catalyst may be obtained via precipitation method or via emulsion—solidification method depending on the physical conditions, especially on the temperature used in the contacting step. Emulsion is also called a liquid/liquid two-phase system.

In both methods (precipitation or emulsion-solidification) the catalyst chemistry is the same.

In the precipitation method combining the solution of a mixture Group 2 metal compounds with the at least one transition metal compound is carried out and the whole reaction mixture is kept at least at 50° C., more preferably at the temperature in the range of 55 to 110° C., more preferably in the range of 70 to 100° C., to secure full precipitation of the catalyst component in form of a solid particles.

In the emulsion—solidification method the solution of a mixture Group 2 metal compounds is added to the at least one transition metal compound at a lower temperature, such as from −10 to below 50° C., preferably at a temperature in the range of −5 to 30° C. During agitation of the emulsion the temperature is typically kept at −10 to below 40° C., preferably from −5 to 30° C. Droplets of the dispersed phase of the emulsion form the catalyst composition. Solidification of the droplets is suitably carried out by heating the emulsion to a temperature of 70 to 150° C., preferably to 80 to 110° C.

In the emulsion-solidification method, the dispersed phase in the form of liquid droplets of the emulsion forms the catalyst part, which is transformed to solid catalyst particles during the solidification step.

The catalyst prepared by emulsion—solidification method is preferably used in the present invention.

In the emulsion-solidification method, the formation of the liquid/liquid two-phase system (emulsion) may be facilitated by adding (further) solvent(s) and additives, such as surfactants. Surfactants act as emulsifying agents, which are used in a manner known in the art for facilitating the formation of and/or stabilizing the emulsion. Preferably, surfactants used in the present invention are acrylic or methacrylic polymers. Particular preferred surfactants are unbranched $C_{12}$ to $C_{20}$ (meth)acrylates such as poly(hexadecyl)-methacrylate and poly(octadecyl)-methacrylate and mixtures thereof. Surfactants may added at any step before the recovery step III. Surfactants may also be used in preparing a catalyst component by the above precipitation method.

Before the final recovery the solid particulate catalyst product produced according to the process of the invention may be washed at least once, preferably at least three times, most preferably at least five times with aromatic and/or aliphatic hydrocarbons, preferably with toluene, heptane or pentane and/or with $TiCl_4$. Said washing solutions may also contain internal donor(s) and/or compound(s) of Group 13, like trialkyl aluminum, halogenated alkyl aluminum compounds or alkoxy aluminum compounds. The aluminum compounds may also be added during the catalyst synthesis. The catalyst can further be dried, e.g. by evaporation or flushing with nitrogen before the final recovery. If desired, catalyst component may be slurried to an oily liquid with or without any drying step.

The finally obtained Ziegler-Natta catalyst component of the invention is desirably in the form of spherical particles having volumetric median particle size ($D50_{vol}$) of 5 to 200 μm.

The catalyst particles prepared by the method as described above have preferably a surface area of less than 20 m²/g, more preferably of less than 10 m²/g.

Typically, the amount of Ti is in the range of 1-6 wt-%, the amount of Mg is in the range of 10 to 20 wt-% and the amount of the internal donor is in the range of 5 to 35 wt-% in the catalyst component.

The catalyst of the invention comprises, in addition to the solid catalyst component as defined above, a cocatalyst, which is also known as an activator and optionally an external electron donor.

Cocatalysts are preferably organometallic compounds of Group 13 metal, typically aluminium compounds. These compounds include aluminium alkyls and alkyl aluminium halides. Preferably, the alkyl group is a $C_1$-$C_8$ alkyl group, preferably $C_1$-$C_4$ alkyl group, and the halide is a chloride. Preferably the co-catalyst (Co) is a tri ($C_1$-$C_4$) alkylaluminium, di($C_1$-$C_4$)alkyl aluminium chloride or ($C_1$-$C_4$)alkyl aluminium dichloride or mixtures thereof. Most preferably, the alkyl group is ethyl. In one specific embodiment, the co-catalyst (Co) is triethylaluminium (TEAL).

External electron donors are typically used in propylene polymerization, however also known to have been used in ethylene polymerisation. In the present application terms external electron donor and external donor have the same meaning.

Suitable external electron donors (ED) include certain silanes, ethers, esters, amines, ketones, heterocyclic compounds and blends thereof. It is especially preferred to use silanes selected from silanes of the general formula (A)

wherein $R^a$, $R^b$ and $R^c$ are independently same or different a linear, branched or cyclic hydrocarbon group having 1 to 12 carbon atom, in particular an alkyl or cycloalkyl group, and wherein p and q are numbers ranging from 0 to 3 with their sum p+q being equal to or less than 3; or silanes of general formula (B)

wherein $R^3$ and $R^4$ can be the same or different and represent a linear, branched or cyclic hydrocarbon group having 1 to 12 carbon atoms. Preferably, $R^3$ and $R^4$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl, and are more preferably ethyl.

Most preferably external donors are selected form silanes of formula (A) and especially selected from (tert-butyl)$_2$Si(OCH$_3$)$_2$, (cyclohexyl)(methyl)Si(OCH$_3$)$_2$, (cyclopentyl)$_2$Si(OCH$_3$)$_2$ and (phenyl)$_2$Si(OCH$_3$)$_2$.

The catalyst of the present invention is used for polymerising $C_2$ to $C_{10}$ olefin, preferably $C_2$ to $C_6$ olefin, optionally with one or more comonomers. Most commonly produced olefin polymers are polyethylene, polypropylene and copolymers thereof. The catalyst of the present invention is especially suitable for producing polypropylene and copolymers thereof. Commonly used comonomers are alpha-olefin comonomers preferably selected from $C_2$-$C_{20}$-alpha-olefins, more preferably are selected from $C_2$-$C_{12}$-alpha-olefins, such as ethylene, 1-butene, isobutene, 1-pentene, 1-hexene, 4-methyl-1-pentene, 1-heptene, 1-octene, 1-nonene and 1-decene, as well as dienes, such as butadiene, 1,7-octadiene and 1,4-hexadiene, or cyclic olefins, such as norbornene, and any mixtures thereof. Most preferably, the comonomer is ethylene, 1-butene and/or 1-hexene.

The solvents to be employed for the preparation of the present catalyst may be selected among aromatic and aliphatic linear, branched and cyclic hydrocarbons with 5 to 20 carbon atoms, more preferably 5 to 12 carbon atoms, or mixtures thereof. Suitable solvents include benzene, toluene, cumene, xylol, pentane, hexane, heptane, octane and nonane. Toluene, heptane and pentane are particular preferred.

The reaction for the preparation of the magnesium alkoxy compound may be carried out at a temperature of 0° to 80° C., preferably at a temperature of 20° to 70° C. Most suitable temperature is selected depending on the Mg compound and alcohol(s) used.

According to a preferred embodiment the catalyst component of the present invention is in the form of solid spherical particles and is free of any external support material, like silica or any separately prepared MgCl$_2$ based support. The solid catalyst component is prepared by the process as described above.

According to the preferred preparation method the solution of MgCl$_2$ and at least one magnesium alkoxide, at least one compound of a transition metal of Group 4 to 6, in liquid form, most preferably a TiCl$_4$, and the internal electron donor or precursor thereof are contacted and reacted in solution, and after that the solid catalyst particles are formed either by precipitation or by forming an emulsion and further solidifying the droplets of the emulsion. The final catalyst contains said internal electron donor as defined above, and Ti and Mg in amounts as indicated above. The preferred methods result in the catalyst component in the form of solid particles having features as indicated above. In addition the solid catalyst particles are featured by a uniform distribution of catalytically active sites thorough the catalyst particles.

Polymerisation

Catalyst of the present invention can be used in any commonly used uni- and multimodal processes for producing polyolefins. The polymerizations may be operated in slurry, solution, or gas phase reactors or combinations thereof. Typically ethylene and propylene (co)polymers are produced in commercial scale in a multimodal process configuration. Such multimodal polymerization processes known in the art comprise at least two polymerization stages. It is preferred to operate the polymerization stages in cascaded mode. Suitable processes comprising cascaded slurry and gas phase polymerization stages are disclosed, among others, in WO92/12182 and WO96/18662 and WO WO98/58975.

In a multimodal polymerisation configuration, the polymerisation stages comprise polymerisation reactors selected from slurry and gas phase reactors. In one preferred embodiment, the multimodal polymerisation configuration comprises at least one slurry reactor, followed by at least one gas phase reactor.

The catalyst may be transferred into the polymerization process by any means known in the art. It is thus possible to suspend the catalyst in a diluent and maintain it as homogeneous slurry. Especially preferred is to use oil having a viscosity from 20 to 1500 mPa-s as diluent, as disclosed in WO-A-2006/063771. It is also possible to mix the catalyst with a viscous mixture of grease and oil and feed the resultant paste into the polymerization zone. Further still, it is possible to let the catalyst settle and introduce portions of thus obtained catalyst mud into the polymerization zone in a manner disclosed, for instance, in EP-A-428054.

The polymerization in slurry may take place in an inert diluent, typically a hydrocarbon diluent such as methane, ethane, propane, n-butane, isobutane, pentanes, hexanes, heptanes, octanes etc., or their mixtures. Preferably, the diluent is a low-boiling hydrocarbon having from 1 to 4 carbon atoms, like propane or a mixture of such hydrocarbons. In propylene polymerisation the propylene monomer is usually used as the reaction medium.

The temperature in the slurry polymerization is typically from 40 to 115° C., preferably from 60 to 110° C. and in particular from 70 to 100° C., like from 70 to 90° C. The pressure is from 1 to 150 bar, preferably from 10 to 100 bar.

The slurry polymerization may be conducted in any known reactor used for slurry polymerization. Such reactors include a continuous stirred tank reactor and a loop reactor. It is especially preferred to conduct the polymerization in loop reactor. Hydrogen is fed, optionally, into the reactor to control the molecular weight of the polymer as known in the art. Furthermore, one or more alpha-olefin comonomers may be added into the reactor. The actual amount of such hydrogen and comonomer feeds depends on the desired melt index (or molecular weight), density or comonomer content of the resulting polymer.

The polymerization in gas phase may be conducted in a fluidized bed reactor, in a fast fluidized bed reactor or in a settled bed reactor or in any combination of these.

Typically the fluidized bed or settled bed polymerization reactor is operated at a temperature within the range of from 50 to 100° C., preferably from 65 to 90° C. The pressure is suitably from 10 to 40 bar, preferably from 15 to 30 bar.

Also antistatic agent(s) may be introduced into the slurry and/or gas phase reactor if needed. The process may further comprise pre- and post-reactors.

The actual polymerization steps may be preceded by a pre-polymerisation step. The pre-polymerisation step may be conducted in slurry or in gas phase. Preferably pre-polymerisation is conducted in slurry, and especially in a loop reactor. The temperature in the pre-polymerisation step is typically from 0° C. to 90° C., preferably from 20° C. to 80° C. and more preferably from 30° C. to 70° C.

The pressure is not critical and is typically from 1 to 150 bar, preferably from 10 to 100 bar.

The polymerisation may be carried out continuously or batch wise, preferably the polymerisation is carried out continuously in commercial scale polymerisation.

FIG. 1: Catalyst component in the form of spherical particles prepared according to Comparative example 3.

Figure 2:
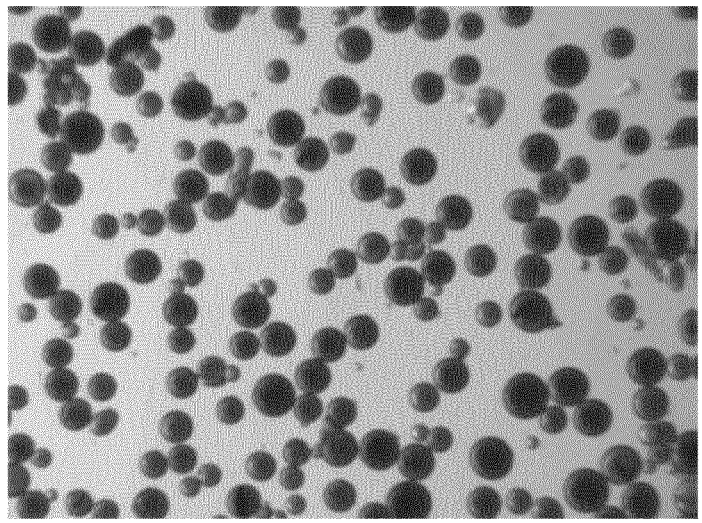

FIG. 2: Catalyst component in the form of spherical particles prepared according to Inventive example 4.

Figure 3:
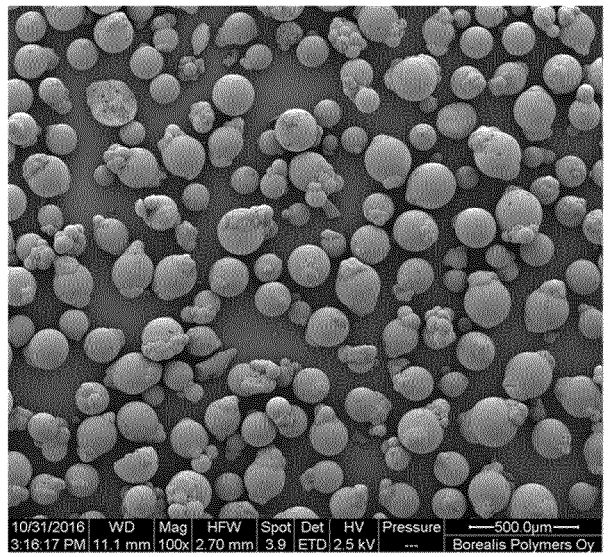

FIG. 3: Catalyst component in the form of spherical particles prepared according to Inventive example 5.

Figure 4:
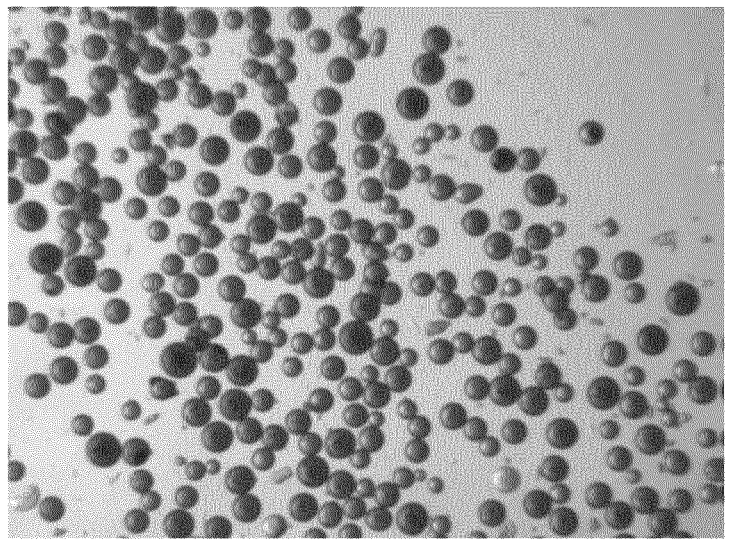

FIG. 4: Catalyst component in the form of spherical particles prepared according to Inventive example 6

Figure 5:
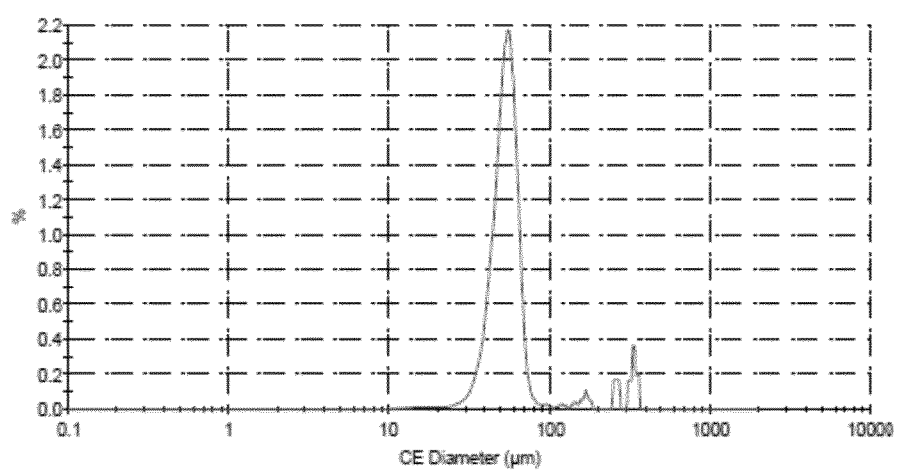

FIG. 5: Volumetric Particle Size Distribution of catalyst component of Inventive example 6

EXPERIMENTAL PART

Measurement Methods
Ti, Mg and Al Content—ICP-OES

The sample consisting of dry catalyst powder is mixed so that a representative test portion can be taken. Approximately 20-50 mg of sample is sampled in inert atmosphere into a 20 ml volume crimp cap vial and exact weight of powder recorded.

A test solution of known volume (V) is prepared to a volumetric flask. Sample digestion is performed in the cooled vial by adding a small amount of freshly distilled (D) water (5% of V) followed by concentrated nitric acid ($HNO_3$, 65%, 5% of V). The mixture is transferred to the volumetric flask. The solution diluted with D water up to the final volume, V, and left to stabilise for two hours.

The elemental analysis of the aqueous samples are run at room temperature using a Thermo Elemental iCAP 6300 Inductively Coupled Plasma-Optical Emission Spectrometer (ICP-OES). The instrument is calibrated for Al, Ti and Mg using a blank (a solution of 5% $HNO_3$), and 6 standards of 0.5 ppm, 1 ppm, 10 ppm, 50 ppm, 100 ppm and 300 ppm of Al, Ti and Mg in solutions of 5% $HNO_3$ DI water. Curve linear fitting and 1/concentration weighting is used for the calibration curve.

Immediately before analysis the calibration is verified and adjusted (instrument function named 'reslope') using the blank and a 300 ppm Al, 100 ppm Ti, Mg standard. A quality control sample (QC; 20 ppm Al and Ti, 50 ppm Mg in a solution of 5% $HNO_3$ in D water) is run to confirm the reslope. The QC sample is also run after every 5th sample and at the end of a scheduled analysis set.

The content of magnesium is monitored using the 285.213 nm and the content for titanium using 336.121 nm line. The content of aluminium is monitored via the 167.079 nm line, when Al concentration in test portion is between 0-10 wt-% and via the 396.152 nm line for Al concentrations above 10 wt-%. The reported values are an average of three successive aliquots taken from the same sample and are related back to the original catalyst sample by inputting the original mass of test portion and the dilution volume into the software.

Internal Electron Donor Content—GC-FID

The sample consisting of dry catalyst powder is mixed so that a representative test portion can be taken. Approximately 60-90 mg of sample is sampled in inert atmosphere into a 20 ml volume crimp cap vial and exact weight of powder recorded.

The test solution consisting of the internal donor in dichloromethane is prepared by liquid-liquid extraction of sample, water and organic solvent as follows: The test portion is dissolved in a volume of 5 ml of dichloromethane. A solution consisting of the internal standard dimethyl pimelate (0.28 V/V-%) and deionised water is added in a volume of 1 ml using a precision microsyringe. The suspension is sonicated for 20 min and let settle for phases to separate. The organic phase is sampled and filtered using a 0.45 μm filter to instrument vials.

The measurement is performed on an Agilent 7890B Gas Chromatograph equipped with flame ionisation detector. The column used is a ZB-5HT Inferno 15 m×320 μm×0.25 μm with midpoint backflush through a three channel of auxiliary EPC and a pre column restriction capillary of 1.5 m×320 μm×0 μm. The oven holds an initial temperature of 40° C. and hold time of 3 min. The ramp program consists of a first rate of 5° C./min to 70° C. and second ramp of 40° C./min to 330° C. and third ramp of 20° C./min to 350° C. with a hold time of 1 min.

The inlet operates in split mode. Injection volume is 1 μL, inlet temperature 280° C., pressure 2.941 psi, total flow 19.8 mL/min and split ratio 20:1. Carrier gas is 99.995% He with pre column flow of 0.8 mL/min and additional flow from backflush EPC to analytical column of 1 mL/min. The FID Detector operates at 370° C. with $N_2$ makeup flow of 25 ml/min, synthesised air flow of 350 ml/min and hydrogen flow of 35 ml/min.

Signal from FID in chromatogram is integrated and calculated against a series of standardisation samples, using the response ratios between the signal for the internal donor and the internal standard dimethyl pimelate. Identity is determined by retention time. The standardisation for the internal donor has been performed with 4 standardisation solutions in a range of known masses of the internal donor corresponding to 7.68 mg to 19.11 mg normalised to 100 mg of sample and treated with the same sample preparation as the samples. The calibration curve for the response ratios is linear without sample concentration weighting. A quality control sample is used in each run to verify the standardisation. All test solutions are run in 2 replicate runs. The mass of the test portion is used for calculating the internal electron donor content for both replicates and the result reported as the average.

Particle Size Distribution—Automated Image Analysis

The sample consisting of dry catalyst powder is mixed so that a representative test portion can be taken. Approximately 50 mg of sample is sampled in inert atmosphere into a 20 ml volume crimp cap vial and exact weight of powder recorded. A test solution is prepared by adding white mineral oil to the powder so that the mixture holds a concentration of approximately 0.5-0.7 wt-%. The test solution is carefully mixed before taking a portion that is placed in a measuring cell suitable for the instrument. The measuring cell should be such that the distance of between two optically clean glasses is at least 200 µm.

The image analysis is run at room temperature on a Malvern Morphologi 3G system. The measuring cell is placed on a microscopy stage with high precision movement in all directions. The physical size measurement in the system is standardised against an internal grating or by using an external calibration plate. An area of the measuring cell is selected so that the distribution of the particles is representative for the test solution. This area is recorded in partially overlapping images by a CCD camera and images stored on a system specific software via a microscope that has an objective sufficient working distance and a magnification of five times. Diascopic light source is used and the illumination intensity is adjusted before each run. All images are recorded by using a set of 4 focal planes over the selected area. The collected images are analysed by the software where the particles are individually identified by comparison to the background using a material predefined greyscale setting. A classification scheme is applied to the individually identified particles, such that the collected population of particles can be identified to belong to the physical sample. Based on the selection through the classification scheme further parameters can be attributed to the sample.

The particle diameter is calculated as the circular equivalent (CE) diameter. The size range for particles included in the distribution is 6.8-200 µm. The distribution is calculated as a numerical moment-ratio density function distribution and statistical descriptors calculated based on the numerical distribution. The numerical distribution can for each bin size be recalculated for an estimate of the volume transformed distribution.

All graphical representations are based on a smothering function based on 11 points and the statistical descriptors of the population are based on the unsmothered curve. The mode is determined manually as the peak of the smothered frequency curve. Span is calculated as the (CE D[x, 0.9]−CE D[x, 0.1])/CE D[x, 0.5].

The following particle size and particle size distribution indicators have been used in the experiments:

$D90_{vol}$=particle diameter at 90% cumulative volume,
$D10_{vol}$=particle diameter at 10% cumulative volume,
$D50_{vol}$=particle diameter at 50% cumulative volume (median particle size, vol)
$SPAN_{vol}$=$(D90_{vol}-D10_{vol})/D50_{vol}$ Melt Flow Rate $MFR_2$: 230° C., 2.16 kg load The melt flow rate is measured in accordance with ISO 1133 and is indicated as g/10 min.

EXAMPLES

Raw Materials $TiCl_4$ (CAS 7550-45-90) was supplied by commercial source.

20% solution in toluene of butyl ethyl magnesium (Mg(Bu)(Et)), provided by Crompton 2-ethylhexanol, provided by Merck Chemicals 3-Butoxy-2-propanol, provided by Sigma-Aldrich bis(2-ethylhexyl)citraconate, provided by Contract Chemicals Viscoplex® 1-254, provided by Evonik Heptane, provided by Chevron $MgCl_2$—Anhydrous magnesium dichloride was provided by Sigma-Aldrich

EXAMPLES

Comparative Example 1 CE1—Preparation of Soluble Mg-Alkoxide 3.4 litre of 2-ethylhexanol (Alcohol A1) and 810 ml of propylene glycol butyl monoether (Alcohol A2) (in a molar ratio A1/A2 of 4/1) were added to a 20 l steel reactor. Then 7.8 litre of a 20% solution in toluene of BEM (butyl ethyl magnesium), were slowly added to the well stirred alcohol mixture. During the addition the temperature was kept at 10° C. After addition the temperature of the reaction mixture was raised to 60° C. and mixing was continued at this temperature for 30 minutes. Finally, after cooling to room temperature the obtained Mg-alkoxide was transferred to a storage vessel. Mg content of 2.75 wt-% was found by ICP. Alcohol to BEM molar ratio was 2.2.

Comparative Example 2 CE2—Preparation of Mg Complex 21.2 g of Mg alkoxide prepared in CE1 was mixed with 4.0 ml of electron donor (bis(2-ethylhexyl)citraconate) for 5 min. After mixing, the obtained Mg complex was used immediately in the preparation of the catalyst component.

Comparative Example 3 CE3—Preparation of the Catalyst Component

Preparation of catalyst component was performed in a jacketed thermostated 100 mL glass reactor equipped with a pitched blade impeller. The reactor was charged with 13.0 ml of $TiCl_4$ and tempered at 15° C. Mixing speed was adjusted to 500 rpm. 16.8 g of Mg-complex prepared in Example CE2 was added to $TiCl_4$ within 20 minutes keeping the temperature at 15° C. 0.7 ml of Viscoplex® 1-254 and 21.0 ml of heptane were then added, whereby an emulsion was formed. Mixing (700 rpm) was continued for 30 minutes at 15° C., after which the reactor temperature was raised to 90° C. within 45 minutes. The reaction mixture was stirred for a further 30 minutes at 90° C. at 700 rpm. Afterwards stirring was stopped and the reaction mixture was allowed to settle for 15 minutes at 90° C. The solid material was washed 5 times: Washings were made at 80° C. under stirring for 20 min with 500 rpm with toluene, $TiCl_4$/donor mixture, toluene and twice with heptane. After stirring was stopped the reaction mixture was allowed to settle for 10-30 minutes and followed by siphoning between the washes.

After the last wash the temperature was decreased to 70° C. with subsequent siphoning, followed by $N_2$ purge for 60 minutes to yield an air sensitive powder.

The catalyst component was isolated in the form of spherical microparticles, as presented in FIG. 1. Catalyst analysis and morphological properties are disclosed in Table 4.

Inventive Example 1/E1—Preparation of Soluble Mg-Alkoxide with 33% of Mg Originating from $MgCl_2$ Mg-alkoxide was prepared using $MgCl_2$ as additional source for magnesium.

MgCl$_2$ was dissolved in an alcohol mixture of 2-ethyl-hexanol (A1) and butoxypropanol (A2) at a temperature of 120° C. for 3 hours. The amounts and ratios of MgCl$_2$ and alcohols are disclosed in Table 1.

TABLE 1

Dissolving MgCl$_2$ to alcohol mixture according to IE1

|  | g | ml | mol | Mol ratio Alcohol/Mg |  |
| --- | --- | --- | --- | --- | --- |
| MgCl$_2$ | 9.96 |  | 0.104 |  |  |
| 2-ethylhexanol | 47.0 | 56.4 | 0.357 | 3.43 | 4.3 |
| butoxypropanol | 11.9 | 13.4 | 0.089 | 0.86 |  |

9.96 g of MgCl$_2$ was placed in a 300 ml glass reactor equipped with a stirrer. Temperature was kept at 25° C. by keeping the reactor in a cooling bath when adding a mixture of 56.4 ml of 2-ethyl hexanol (2-EHA) and 13.4 ml of butoxypropanol. After addition of the alcohol mixture, the reactor temperature was increased to 120° C. After about 3 hours all MgCl$_2$ was dissolved (MgCl2 alcohol solution). The total yield was 68.12 g and the calculated composition comprised 14.6% MgCl$_2$ (3.7% Mg), 68.3% 2-EHA and 17.2% butoxypropanol. 24.46 g of the diluted MgCl$_2$ solution was obtained by mixing together 20.13 g of the previously prepared MgCl$_2$ alcohol solution and 5 ml (4.33 g) toluene to result in 24.5 g of Solution1-1. The magnesium alkoxide solution was prepared by adding 20% butyl ethyl magnesium (BEM) in toluene to the Solution1-1 prepared above according to the procedure as described below: 31.2 ml (49.0 mmol) 20% BEM in toluene was slowly added to 19.83 g of Solution1-1 while keeping the temperature below 25° C. After the addition was completed, a milky solution was obtained which became again clear after the temperature was increased to 60° C. After mixing for 1 hour at 60° C. the solution was cooled down to room temperature (Mg solution mixture). The composition of the magnesium alkoxide solution contained 2.36 g of MgCl$_2$ and 1.19 g of Mg in form of the respective alkoxides, 1.3 g of free alcohol and about 26 g toluene. Consequently, the total amount of Mg in the solution of Mg compound mixture was 1.79 g (4.1 wt %) with 33% of the Mg from added MgCl2, as indicated in Table 2.

TABLE 2

Amount and calculated composition of the magnesium alkoxide solution

| Yield (g) | MgCl2 (g) | Mg (g) | MgCl2 (mmol) | Mg(OR)2 (g) | Mg(OR)2 (mmol) | Mgtot (g) | Mgtot (wt-%) | Mgtot (mmol) |
| --- | --- | --- | --- | --- | --- | --- | --- | --- |
| 43.3 | 2.36 | 0.6 | 24.8 | 1.19 | 49 | 1.79 | 4.1 | 74.8 |

Inventive Example 2 IE2—Preparation of Soluble Mg-Alkoxide with 50% Mg Originating from Magnesium Dichloride Mg-alkoxide was prepared using MgCl$_2$ as additional source for magnesium.

25.08 g of MgCl$_2$ was placed into the 300 ml glass reactor equipped with a stirrer. Temperature was kept around 25° C. by keeping the reactor in cooling bath when slowly adding the mixture of 70.5 ml of 2-ethyl hexanol and 16.7 ml of butoxypropanol. Addition took 75 minutes. The temperature was increased to 135° C. and mixing was continued for 8 hours. During cooling down 25 ml of toluene was added to result in Solution 1-2. Table 3 shows the actual amounts and the MgCl$_2$ to alcohols molar ratio.

TABLE 3

Dissolving MgCl$_2$ to alcohol mixture according to IE2

|  | g | ml | mol | Mol ratio Alcohol/Mg |  |
| --- | --- | --- | --- | --- | --- |
| MgCl$_2$ | 25.08 |  | 0.262 |  |  |
| 2-ethylhexanol | 58.9 | 70.5 | 0.446 | 1.7 | 2.2 |
| butoxypropanol | 14.9 | 16.7 | 0.111 | 0.4 |  |
| Toluene | — | 25 |  | — |  |

The magnesium alkoxide solution was prepared by adding 20% butyl ethyl magnesium (BEM) in toluene to the Solution1-2 prepared above according to the procedure as described below: 162.5 ml of BEM solution (20% in toluene) was very slowly added to the Solution 1-2 keeping the temperature below 25° C. Addition took 3.5 hours. During addition off gas was released and also foam was formed on top of the solution which prevented faster addition. Viscosity of the solution was significantly decreasing during addition. After BEM was fed, the temperature was slowly increased to 60° C. Foaming was continued during heating up. After one hour mixing at 60° C. the solution was cooled down to room temperature. Alcohol to BEM molar ratio was 2.2, which is the same as in comparative example CE1. The obtained composition of the Mg alkoxide solution was a clear solution having 5.2 wt-% of Mg. Half (50%) of the Mg content originates from MgCl$_2$.

Inventive Example 3 IE3—Preparation of Soluble Mg Alkoxide—with 33% Mg Originating from Magnesium Dichloride MgCl$_2$ alcohol solution was prepared by using 10.02 g of MgCl$_2$ dispersed in 15 ml of toluene. Then 56.4 ml of 2-ethyl hexanol and 13.4 ml of butoxypropanol were added to the reactor. Addition time of alcohols was one hour. Temperature was then increased to 125° C. After 90 min mixing all MgCl$_2$ was dissolved and a clear solution was obtained. Viscosity of the obtained solution (Solution1-3) was 210 mPas at room temperature.

The magnesium alkoxide solution was prepared by adding 20% butyl ethyl magnesium (BEM) in toluene to the Solution1-3 as follows: BEM solution (133 ml) (20% in toluene) was added under stirring over several minutes. The temperature was then slowly increased to 80° C. and mixing at this temperature was continued for one hour. During the temperature increase and mixing at 80° C. a significant amount of gas was formed. The temperature was then increased to 90° C. and mixing was continued for another 4 hours. The obtained magnesium alkoxide solution was a clear viscous solution with 33% of magnesium coming from MgCl$_2$ and a calculated magnesium content was 4.2 wt. %.

Inventive Example 4 IE4—Preparation of the Catalyst Component

Catalyst component was prepared following the procedure of comparative examples CE2 and CE3, but using the solution of the mixture of Mg compounds of inventive example IE1.

A 100 ml glass reactor equipped with a mechanical stirrer was charged with 13.0 mL of titanium tetrachloride at 15° C. Mixing speed was adjusted to 500 rpm. Mg-complex prepared by mixing 12.7 g of the solution of Mg compound mixture (Mg-alkoxide) of IE1 and 3.3. ml donor (bis(2-ethylhexyl) citraconate) for 5 min was added to $TiCl_4$ within 20 minutes keeping the temperature at 15° C. 1.0 ml of Viscoplex®1-254 and 15.0 ml of heptane was added, whereby an emulsion was formed. Mixing (700 rpm) was continued for 30 minutes at 15° C., after which the reactor temperature was raised to 90° C. within 45 minutes. The reaction mixture was stirred for a further 30 minutes at 90° C. at 700 rpm. Afterwards stirring was stopped and the reaction mixture was allowed to settle for 15 minutes at 90° C. The solid material was washed 5 times: Washings were made at 80° C. under stirring for 20 min with 500 rpm with toluene, $TiCl_4$/donor mixture, toluene and twice with heptane. After stirring was stopped the reaction mixture was allowed to settle for 10-30 minutes and followed by siphoning between the washes.

Analytical results of the composition of the catalyst component are disclosed in Table 4. The obtained spherical particles are shown in FIG. 2.

Inventive Example 5 IE5—Preparation of the Catalyst Component

Catalyst component was prepared according to the procedure of inventive example IE4, but using the Mg alkoxide solution of inventive example IE2. Catalyst morphology and composition was on a good level.

Analytical results of the composition of the catalyst component are disclosed in Table 4 and the obtained spherical particles are shown in FIG. 3.

Inventive Example 6 IE6—Preparation of the Catalyst Component

The preparation was done as in IE4, except Mg alkoxide solution of IE3 (12.7 g, diluted with 3 mL toluene) was used.

Catalyst was isolated in the form of microspheres. Analytical results of the composition of the catalyst component are disclosed in Table 4. The obtained spherical particles are shown in FIG. 4 and volumetric particle size distribution is disclosed in FIG. 5.

TABLE 4

| Catalyst composition of inventive examples IE4 to IE6 and Comparative example CE3 | | | | | | |
|---|---|---|---|---|---|---|
| Catalyst component | Ti wt-% | Mg wt-% | Donor wt-% | Hydrocarbon wt-% | $D50_{vol}$ | Mg yield % |
| IE4 | 2.35 | 13.5 | 21.2 | 9.9 | NA | 77 |
| IE5 | 3.08 | 14.3 | 21.3 | 6.2 | NA | 92 |
| IE6 | 2.55 | 14.3 | 26.8 | 3.3 | 53 | 72 |
| CE3 | 2.64 | 13.2 | 17.3 | 11.5 | 61 | 77 |

Polymerisation

A 5 litre stainless steel reactor was used for propylene polymerisations.

About 0.9 ml triethyl aluminium (TEA) (from Witco, used as received) as a co-catalyst, ca 0.13 ml dicyclopentyl dimethoxy silane (DCDS) (from Wacker, dried with molecular sieves) as an external donor and 30 ml n-pentane were mixed and allowed to react for 5 minutes. Half of the mixture was then added to the polymerisation reactor and the other half was mixed with about 20 mg of a catalyst. After additional 5 minutes the catalyst/TEA/donor/n-pentane mixture was added to the reactor. The Al/Ti ratio was 250 mol/mol and the Al/DCDS ratio was 10 mol/mol. 200 mmol hydrogen and 1400 g propylene were introduced into the reactor and the temperature was raised within ca 20 minutes to the polymerisation temperature (80° C.). The polymerisation time after reaching polymerisation temperature was 60 minutes, after which the polymer formed was taken out from the reactor. Polymerisation results are disclosed in Table 5.

Polymerisation results show that catalyst activities and melt flow rates remain, as was desired, on the same level in inventive examples and comparative examples 1 and 2, which shows that catalyst of the invention with excellent particle size distribution fulfils the polymerisation criteria. In comparative example 3 the values differ from the other examples, however, the catalyst differs essentially in morphological point of view, and the chemistry of said catalyst is different. As explained in the specification, reactor fouling and plugging will not be seen in the small scale polymerisation tests.

TABLE 5

| Polymerisation results | | | | |
|---|---|---|---|---|
| Catalyst | Activity kg PP/g cat h | MFR2, dg min | BD, kg/m3 | XS, wt. % |
| CE3 | 35.4 | 15.3 | 427 | 1.9 |
| IE4 | 31.0 | 14.0 | NA | 1.6 |
| IE5 | 21.5 | 15.7 | NA | NA |
| IE6 | 22.2 | 13.7 | NA | 1.9 |

The invention claimed is:

1. A process for producing solid Ziegler-Natta catalyst component in the form of solid particles having a median particle size ($D50_{vol}$) of 5 to 500 µm, the process comprising steps:
   I. providing a solution of a mixture of Group 2 metal compounds of:
      i) a solution of a Group 2 metal dihalide and
      ii) at least one Group 2 metal alkoxide of the Periodic Table (IUPAC, Nomenclature of Inorganic Chemistry, 2005),
   II. contacting the solution of the mixture of Group 2 metal compounds of step I with a compound in a liquid form of a transition metal of Group 4 to 10, or of a lanthanide or actinide of Periodic Table (IUPAC, Nomenclature of Inorganic Chemistry, 2005), and
   III. recovering the solid catalyst component,
      wherein the solution of a Group 2 metal dihalide i) is obtained by dissolving a solid Group 2 metal dihalide in an alcohol comprising at least a monohydric alcohol of formula ROH, where R is selected from hydrocarbyl of 3 to 16 C atoms, and wherein the amount of Group 2 metal originating from Group 2 metal dihalide in the solution of the mixture of Group 2 metal compounds is in the range of 5 to 90 mol %.

2. The process according to claim 1, wherein an internal donor selected from esters of carboxylic acids or di-acids, ethers, di-ethers and oxygen or nitrogen containing silicon compounds is added to the process before the recovery step III.

3. The process according to claim 1, wherein the Group 2 metal dihalide is $MgCl_2$ and the Group 2 metal alkoxide is Mg alkoxide.

4. The process according to claim 1, wherein the transition metal compound of Group 4 to 10, or of a lanthanide or actinide is a Group 4 to 6 transition metal compound.

5. The process according to claim 1, wherein the amount of Group 2 metal originating from Group 2 metal dihalide is in the range of 10 to 85 mol %.

6. The process according to claim 1, wherein the Group 2 metal dihalide is dissolved in a mixture of alcohols comprising the monohydric alcohol of formula ROH (A1), where R is selected from a hydrocarbyl of 3 to 16 C atoms, and an alcohol (A2) comprising in addition to the hydroxyl group another oxygen containing functional group not being a hydroxyl group.

7. The process according to claim 1, wherein the Group 2 metal dihalide is dissolved in a mixture of alcohols comprising the monohydric alcohol of formula ROH (A1), where R is selected from a hydrocarbyl of 3 to 16 C atoms, and an alcohol (A2) comprising in addition to the hydroxyl group another oxygen containing functional group not being a hydroxyl group; and wherein in the alcohol (A2) another oxygen containing functional group not being a hydroxyl group is an ether group, wherein the ether moiety comprises from 2 to 18 carbon atoms.

8. The process according to claim 1, wherein the mol ratio of the monohydric alcohol (A1): alcohol (A2) is in the range of 10:0 to 1:9.

9. A process for producing polymers of α-olefins of 2 to 10 C atoms or copolymers thereof with $C_2$ to $C_{12}$ α-olefin comonomers in the presence of the Ziegler-Natta catalyst component in the form of solid particles having a median particle size ($D50_{vol}$) of 5 to 500 μm obtained, by a process comprising steps:

I. providing a solution of a mixture of Group 2 metal compounds of
   i) a solution of a Group 2 metal dihalide and
   ii) at least one Group 2 metal alkoxide of the Periodic Table (IUPAC, Nomenclature of Inorganic Chemistry, 2005)

II. contacting the solution of the mixture of Group 2 metal compounds of step I with a compound in a liquid form of a transition metal of Group 4 to 10, or of a lanthanide or actinide of Periodic Table (IUPAC, Nomenclature of Inorganic Chemistry, 2005), and III. recovering the solid catalyst component,
   wherein the solution of a Group 2 metal dihalide i) is obtained by dissolving a solid Group 2 metal dihalide in an alcohol comprising at least a monohydric alcohol of formula ROH, where R is selected from hydrocarbyl of 3 to 16 C atoms, and
   wherein the amount of Group 2 metal originating from Group 2 metal dihalide in the solution of the mixture of Group 2 metal compounds is in the range of 5 to 90 mol %.

\* \* \* \* \*